United States Patent [19]

Montemayor et al.

[11] Patent Number: 5,842,557

[45] Date of Patent: *Dec. 1, 1998

[54] AUTOMATIC TORTILLA STACK TRANSFER

[75] Inventors: Ezequiel Montemayor, Palos Verdes Estates; Antonio Coronado, Downey, both of Calif.

[73] Assignee: Desarrollo Industrial Y Tecnologico, S.A. de C.V., Nuevo Leon, Mexico

[ * ] Notice: This patent issued on a continued prosecution application filed under 37 CFR 1.53(d), and is subject to the twenty year patent term provisions of 35 U.S.C. 154(a)(2).

[21] Appl. No.: 763,210

[22] Filed: Dec. 11, 1996

[51] Int. Cl.⁶ .................................................. B65G 47/30
[52] U.S. Cl. ........................ 198/418.1; 198/358; 198/368; 198/433
[58] Field of Search ................................ 198/358, 368, 198/418.1, 433

[56] References Cited

U.S. PATENT DOCUMENTS

| | | |
|---|---|---|
| 2,112,309 | 3/1938 | Santillan . |
| 2,182,068 | 12/1939 | Clark . |
| 2,362,079 | 11/1944 | McCann et al. ......................... 198/358 |
| 2,575,220 | 11/1951 | Hiller ........................................ 198/32 |
| 2,715,950 | 8/1955 | Law ........................................... 186/55 |
| 2,942,715 | 6/1960 | Miller ....................................... 198/368 |
| 3,080,079 | 3/1963 | Lecrone et al. . |
| 3,148,876 | 9/1964 | Chandler et al. . |
| 3,223,053 | 12/1965 | Jimenez et al. . |
| 3,245,356 | 4/1966 | Jimenez et al. . |
| 3,247,927 | 4/1966 | Langley .................... 198/368 |
| 3,274,959 | 9/1966 | Jimenez et al. . |
| 3,467,029 | 9/1969 | Hayes . |
| 3,522,942 | 8/1970 | Hepp ..................................... 198/358 |
| 3,570,393 | 3/1971 | Schy . |
| 3,602,130 | 8/1971 | Perez . |
| 3,648,596 | 3/1972 | Zito . |
| 3,667,372 | 6/1972 | Hilvitz et al. . |
| 3,712,453 | 1/1973 | Hurst . |
| 3,722,400 | 3/1973 | Jimenez . |
| 3,756,374 | 9/1973 | Burt et al. ............................... 198/368 |
| 3,785,273 | 1/1974 | Stickle . |
| 3,917,050 | 11/1975 | Gregor ..................................... 198/358 |
| 3,924,567 | 12/1975 | Koeleman et al. . |
| 3,928,638 | 12/1975 | Stickle . |
| 3,955,812 | 5/1976 | Suda et al. . |
| 4,006,831 | 2/1977 | Jimenez . |
| 4,029,194 | 6/1977 | Feurstein et al. ........................ 198/358 |
| 4,160,043 | 7/1979 | Stickle et al. . |
| 4,184,418 | 1/1980 | Jimenez . |
| 4,197,792 | 4/1980 | Mendoza . |
| 4,197,793 | 4/1980 | Hanson et al. . |
| 4,208,441 | 6/1980 | Westover . |
| 4,620,826 | 11/1986 | Rubio et al. . |
| 4,724,947 | 2/1988 | Opperthauser .......................... 198/433 |
| 4,926,999 | 5/1990 | Fauth, Sr. et al. ....................... 198/368 |
| 4,938,126 | 7/1990 | Rubio et al. . |
| 5,195,741 | 3/1993 | Stauber . |
| 5,318,165 | 6/1994 | Spatafor et al. ......................... 198/433 |
| 5,494,398 | 2/1996 | Montemayor et al. . |
| 5,653,328 | 8/1997 | Pedrotto ................................... 198/433 |

FOREIGN PATENT DOCUMENTS 1415854  11/1975  United Kingdom ..................... 198/32

*Primary Examiner*—Karen M. Young
*Assistant Examiner*—Douglas Hess
*Attorney, Agent, or Firm*—Eugene Chovanes

[57] ABSTRACT

An automatic system for arranging stacks of tortillas, first into rows, and then into a single file. The stacks of tortillas emerge at random from a stacker in a baking line or lines and are formed successively into a row, and then into a file of uniformly spaced stacks in a direction normal to the baking line or lines for travel into a packaging machine.

4 Claims, 5 Drawing Sheets

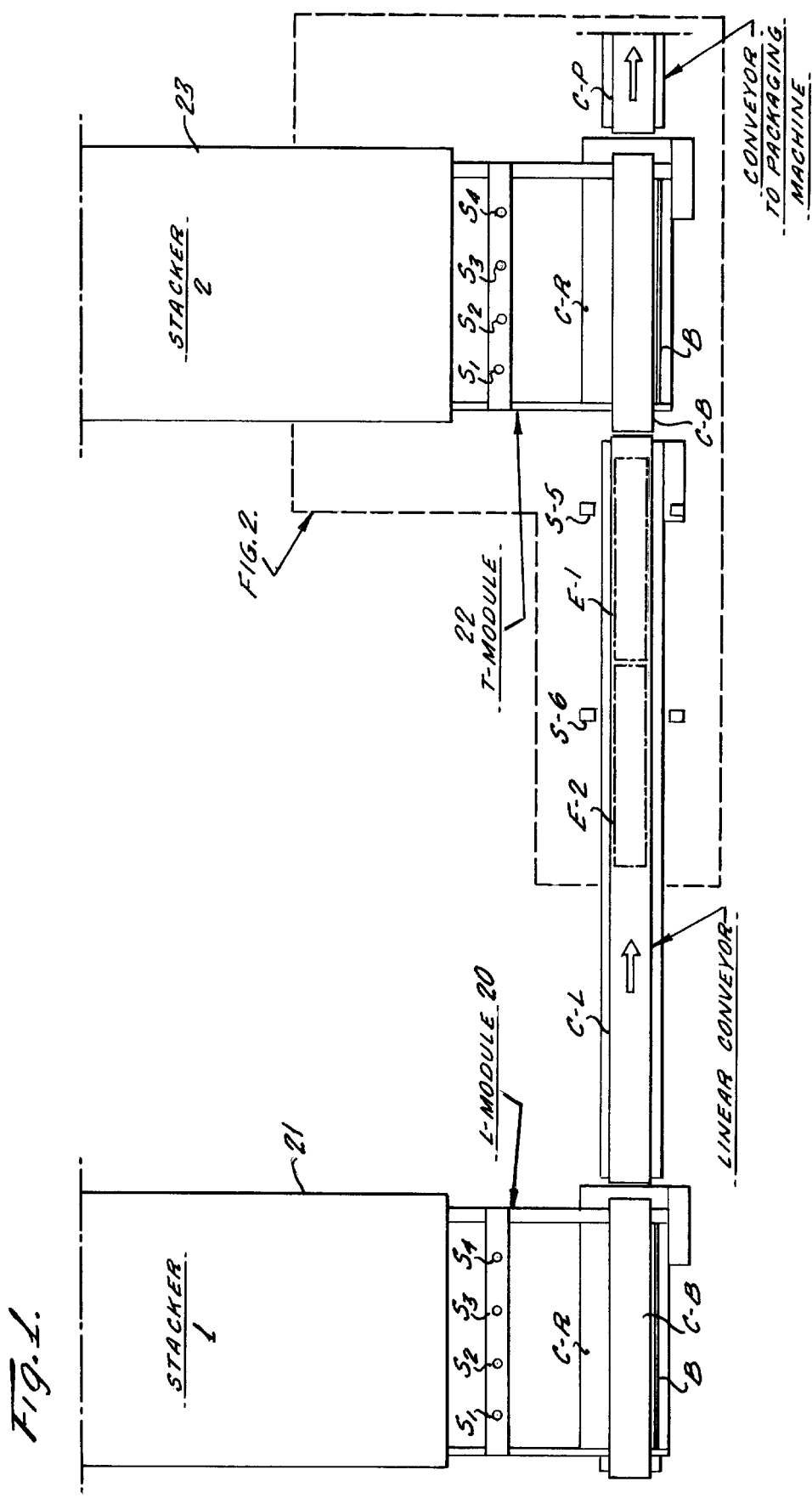

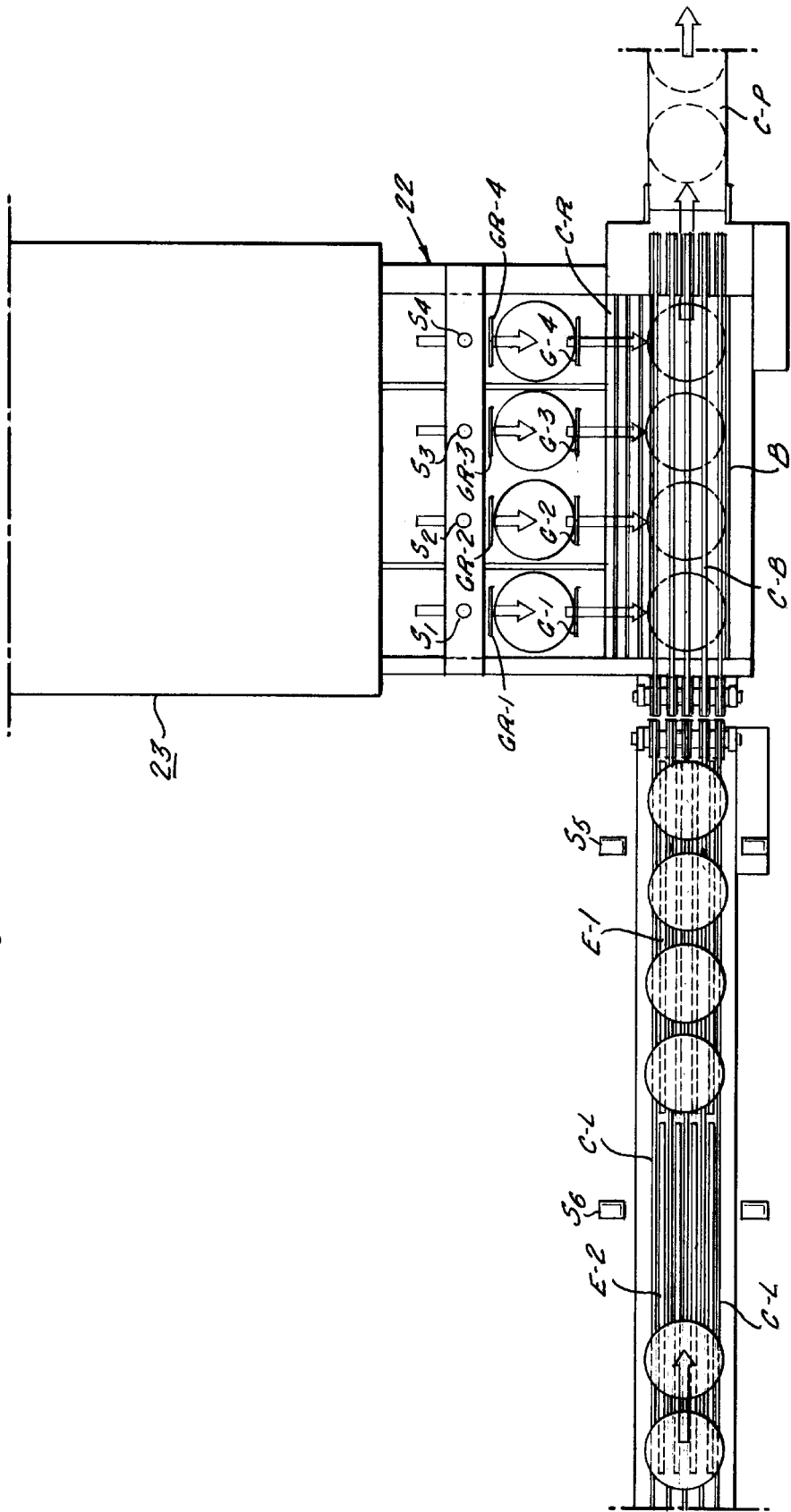

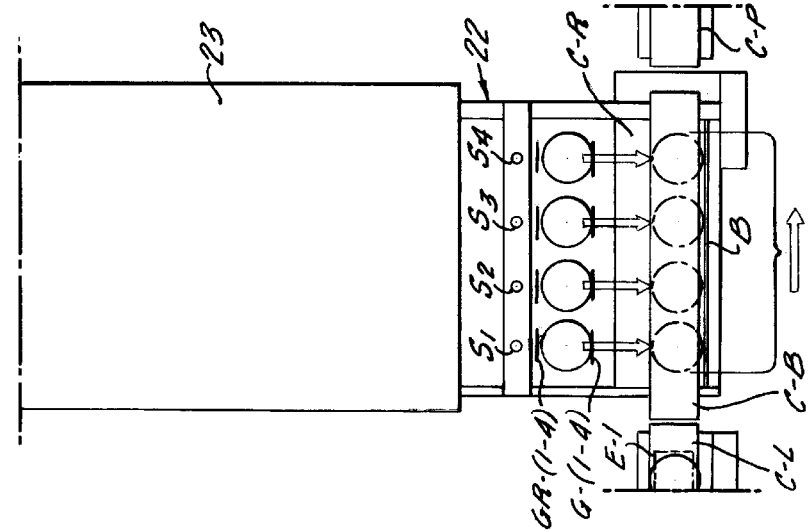
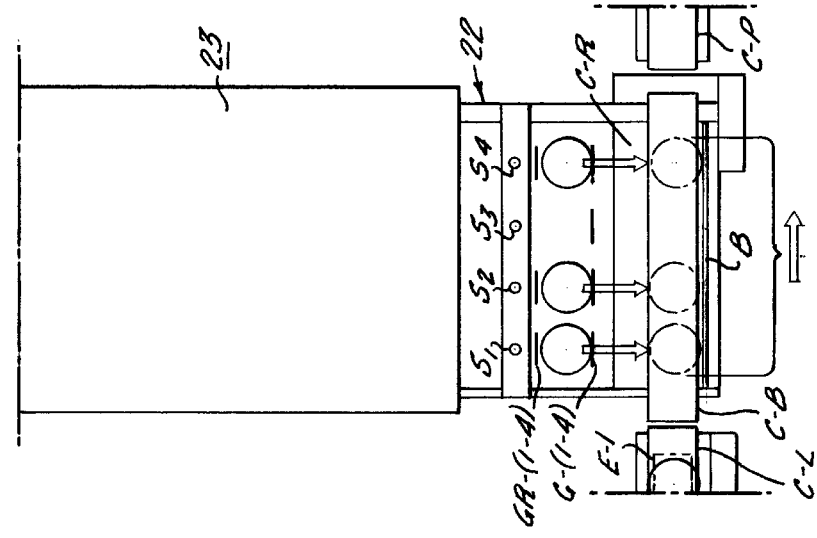
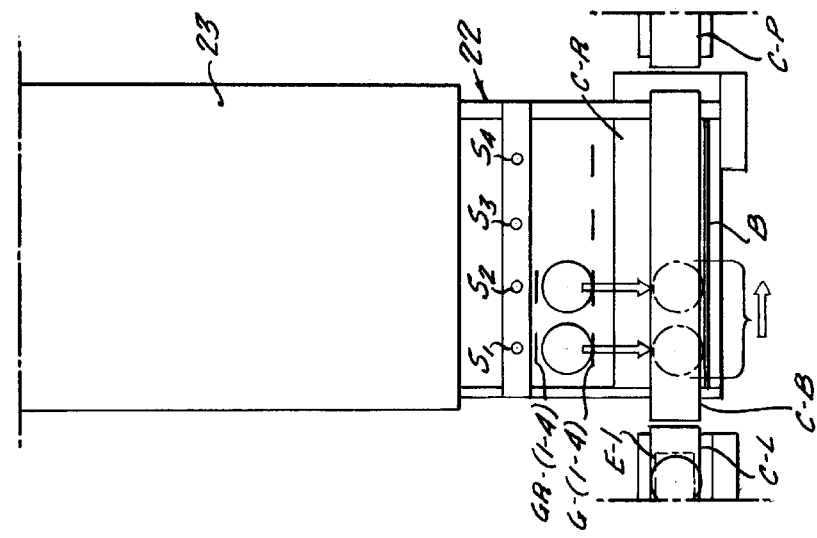

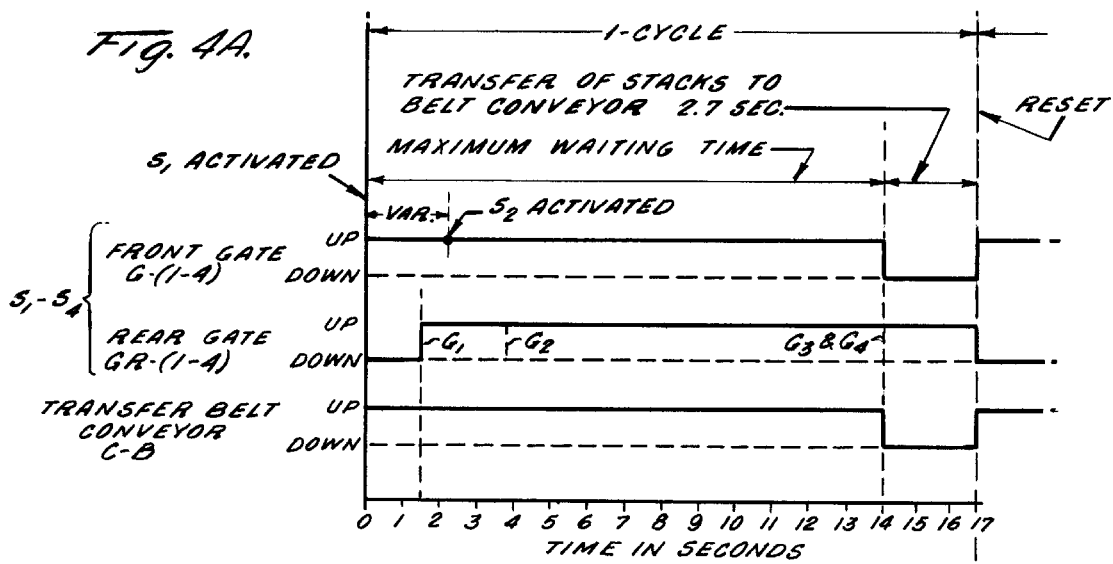
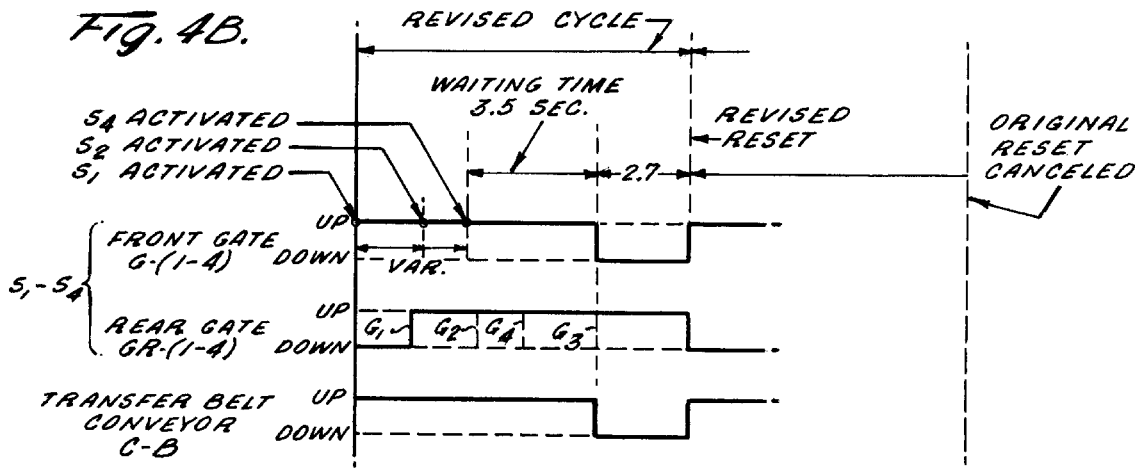
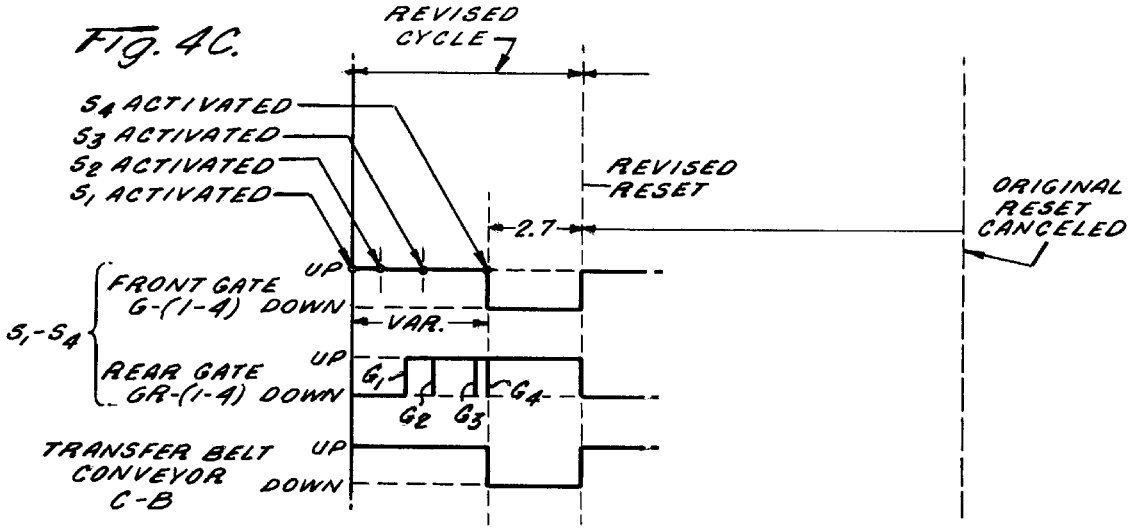

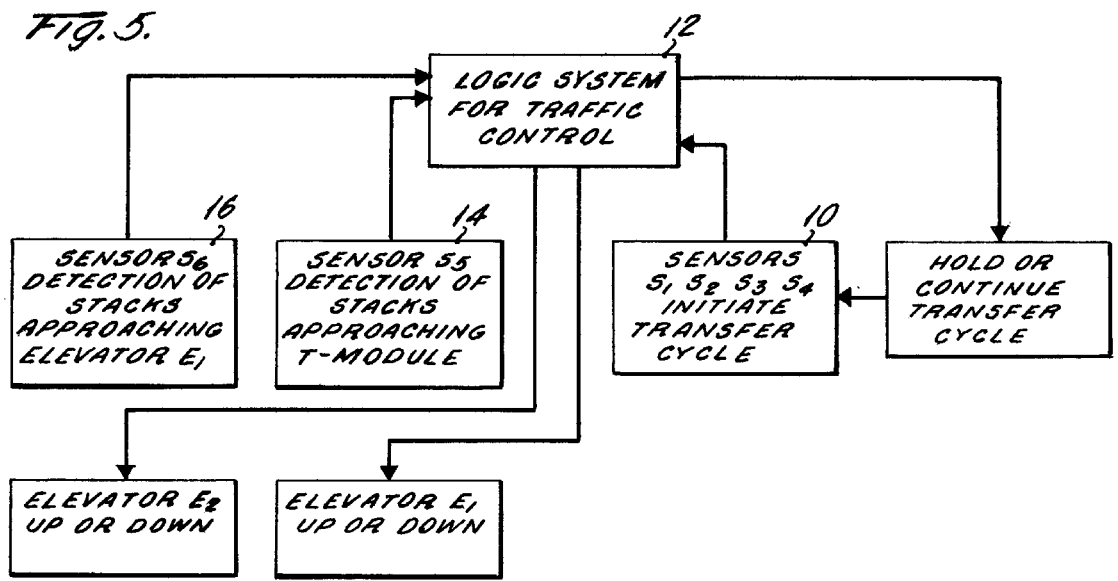
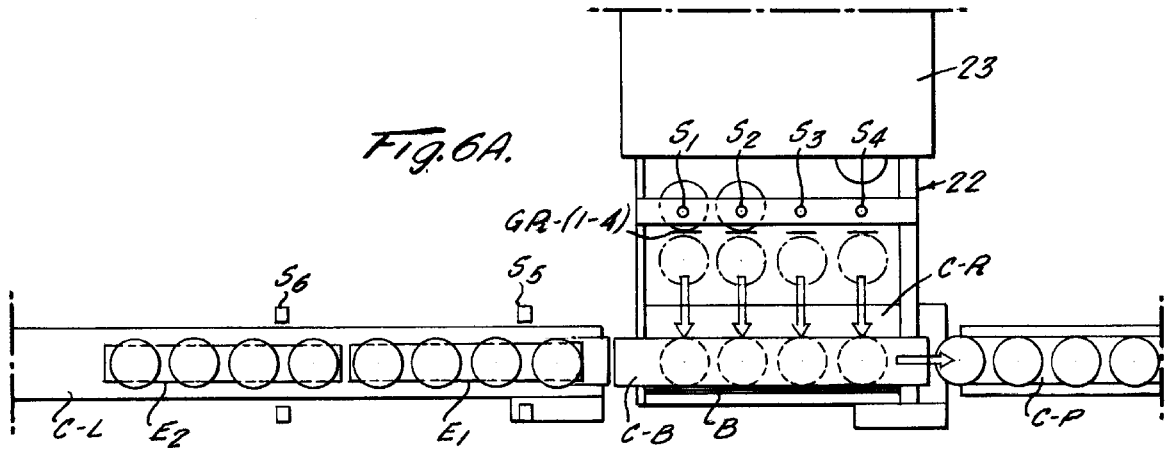
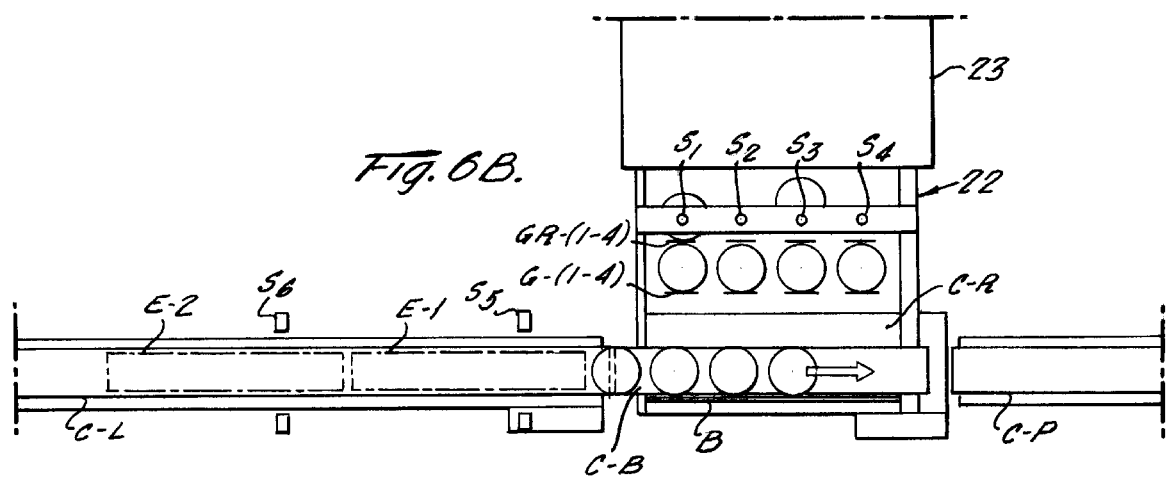

AUTOMATIC TORTILLA STACK TRANSFER

BACKGROUND OF THE INVENTION

1. Field of the Invention

The invention relates to tortillas and other baked unfermented dough products in generally flat form that are stacked within a package.

2. Background Information

Tortillas are well known as a food product. Their history is an old one. Essentially, they are a mixture of ground corn meal formed into flat dough disks which are then baked on a hot surface. For untold years, the tortillas were formed individually in a primitive fashion on, for instance, a hot rock surface or in later times on a heated metal plate. The tortillas were handled individually and were made at a relatively slow pace.

Now, most tortillas are machine made and there is an extensive technology that has been created with respect to machinery for preparing tortillas, and even for packaging such tortillas after baking.

The baking process is essentially an in-line arrangement where a masa mix and water are fed into the system at one end and the fully baked or partially baked tortillas emerge at the other end. The individually baked tortillas are formed into stacks of, for instance, 12 or 24 by automated stackers. The tortillas emerge in stacks from the stacker on a forward traveling endless exit belt. The belts can be, for instance, 30 inches wide. The stacks of tortillas are randomly deposited lengthwise on the belt, generally in four lanes evenly spaced across the exit belt.

The stacks are then manually picked up and deposited single file on a feed belt traveling at a right angle to the stacker exit belt to a packaging machine which consists of a mechanism for depositing stacks of tortillas into a transparent bag which is then automatically heat sealed. The bags of stacked tortillas are then placed into cartons for shipment.

In the further development of machine produced and packaged tortillas as described above, multiple lines for producing tortillas have been created. These are generally parallel to one another in a side-by-side relationship. In order to further mechanize the packaging operation, a belt which receives the tortillas from the baking lines, and then feeds the tortillas into the packaging machine, is placed normal to the multiple baking lines to receive the stacks of tortillas from these lines. This continuously traveling belt carries the stacks of baked tortillas from the ends of the baking line, normal thereto, into the packaging machine.

3. The Current Problem

The current problem can perhaps best be characterized as a "traffic jam" created when the tortillas come off the baking lines on the exit belts, onto the continuous traveling belt that carries the tortillas into the packaging machine. In the prior art, a jamming of one tortilla into another is prevented simply by manually picking up the tortillas from the baking line and depositing them in spaced relationship on the packaging line. This requires multiple persons working quickly and continuously since all the processes described are continuous ones generating substantial amounts of tortillas.

SUMMARY OF THE INVENTION

The present invention eliminates the need for manual handling of the tortillas from the baking lines for arrangement in non-interfering fashion onto the packaging lines.

The invention is in effect a "traffic control" system for organizing stacks of tortillas emerging at random from a baking oven and stacking machine onto a linear conveyor, positioned normal to the lines of stacks of tortillas emerging from the baking machines, in uniformly spaced single file order.

The flow of stacks of tortillas emerge on a conveyor belt or belts from a baking machine or machines in a first given direction in one or more parallel lines. The linear conveyor packaging line runs in a second direction perpendicular to the first given direction. The conveyor packaging line takes the stacks, after they have been uniformly spaced single file, into a prior art packaging machine wherein the individual stacks are wrapped in a suitable covering of for instance, plastic.

The stacking is done at the end of the tortilla production or baking line in a stacker of the type shown in U.S. Pat. No. 4,006,831 wherein the stacks, although distributed across the discharge belt evenly, are randomly disposed longitudinally in the direction of travel of the belt.

The present invention by means of sensors and stops such as gates or lifts selectively halts the forward travel of the individual stacks of tortillas emerging from the baking machine to form a uniform row across the conveyor belt of up to four stacks. When the row is formed, the gates drop and permit the stacks in row form to progress forward to the perpendicularly disposed linear conveyor carrying the stacks into the packaging machine. When deposited on the linear conveyor, the row of up to four individual stacks of tortillas progress toward the packaging machine in single file fashion, uniformly spaced.

When the gates halt travel of the stacks to form the uniform row from the discharge of the tortilla baking machine, a separate set of gates in the rear of the first set of gates hold up any stacks from progressing and interfering with the formation of the first uniform row. Thus, the two sets of gates work in coordination in achieving the objective of depositing uniform rows of tortillas onto the linear packaging conveyor line.

When two or more baking and stacking lines are used, they are set adjacent and parallel to one another. One baking and stacking line in effect forms an L with the linear conveyor, and the other line or lines, inwardly toward the packaging machine, in effect form an inverted T with the packaging conveyor or line. Where two or more such lines are used, the baking line designated a T line generally has priority in depositing stacks of tortillas onto the linear packaging conveyor line over the L line. A separate set of sensors and gates hold up any oncoming interfering stacks of tortillas from the L baking line until the linear packaging conveyor is clear of deposits from the T line. Where a plurality of T lines are also used, the T line closest to the packaging machine has priority.

The sensors and gates are all coordinated through a central program in a computer operation which sets certain time spans for particular operations.

BRIEF DESCRIPTION OF THE DRAWINGS

FIG. 1 is a schematic plan view illustrating the primary components and their respective locations in providing an automated conveying system for handling tortillas discharged from two stackers.

FIG. 2 is an enlarged fragmentary plan view of the detail contained within the dashed outline, designated FIG. 2, in FIG. 1 showing additional details of construction.

FIG. 3A is a fragmentary schematic plan view showing a first programmed condition wherein two stacks have been sensed and have arrived at the holding front gates on the conveyor portion of the T module, thereby initiating a transfer cycle.

FIG. 3B is a view similar to FIG. 3A but showing another pre-programmed condition wherein three stacks have been sensed and have arrived at the holding front gates on the module.

FIG. 3C is a view similar to FIG. 3A and FIG. 3B but showing still another programmed condition wherein four stacks have been sensed and have arrived at the holding front gates on the module.

FIG. 4A is a timing diagram showing the timed relationship and positioning of the four front gates, the four rear gates and the transfer belt conveyor when only one or two stacks arrive, are sensed by any of the four sensors and are stopped by the front gates as shown in FIG. 3A initiating a pre-programmed timed cycle of operation while waiting for stacks 3 and 4. If stacks 3 or 4 do not arrive within the 14 second counts timed from the arrival of the first stack the front gates go down, and the rear gates go up. The transfer belt goes down and the two stacks are driven across the roller conveyor against a longitudinal extending barrier. The belt conveyor is then raised and the two stacks are carried onto the packaging conveyor.

FIG. 4B is the same as 4A except three sensed stacks reset a 14 seconds wait to 3.5 seconds from arrival time of a third stack. Then the transfer cycle is initiated.

FIG. 4C is the same as 4B except when four stacks are sensed there is no waiting time delay. Transfer cycle is immediate.

FIG. 5 is a schematic block diagram showing traffic controlling means for providing a continual flow of stacks along the linear conveyor to the packaging conveyor.

FIG. 6A is a schematic plan view illustrating a traffic control condition wherein the T-module is in a transfer cycle mode and the stacks riding the linear conveyor are in a holding mode by means of two elevators.

FIG. 6B is a schematic plan view illustrating a traffic control condition wherein the T-module is in a hold cycle mode while traffic on the linear conveyor passes through on the belt conveyor to the packaging conveyor.

DESCRIPTION OF THE PREFERRED EMBODIMENT

The Structure As Seen in the Drawings.

The transfer conveyor system consists of at least two separate modules linked by a linear conveyor. An L-module is combined with one or more T-modules. As seen in FIG. 1, L-module 20 is connected to a stacker 1 assembly in baking line 21 and T-module 22 is connected to the stacker 2 assembly in baking line-23. Stackers 1 and 2 respectfully received the baked tortillas from the ovens in line with these stackers.

The stackers are of the type shown in U.S. Pat. No. 4,006,831, incorporated herein by reference. Linear conveyor systems receive the tortillas coming out of stackers 1 and 2, and convey them to a prior art packaging machine (not shown). The designations "L" and "T" are based on the arrangement wherein, with respect to line 21, the product going onto the conveyor 25, comes onto the conveyor in "L" fashion from the baking line, whereas, tortillas are traveling in "T" fashion in the vicinity of module 22 since they are going onto conveyor belt 25 from baking line 23 as well as coming on the conveyor line from the direction of baking line 21. L-module 20 receives a flow of four lanes of tortilla stacks and directs the stacks in a 90 degree turn onto the linear conveyor 25. T-module 22 also receives a flow of four lines of tortilla stacks from its stacker and directs them into a 90 degree turn onto linear conveyor 25.

Both the L-module 20 and the T-module 22 are identical in construction and operation, although the sequence of operations will differ to permit coordinated flow of the tortilla stacks from the stackers. The same reference numerals will generally apply to the L and T-modules.

The invention uses stops, in the form of gates or lifters, which selectively rise or drop to selectively stop or permit the advance of stacks of tortillas. Activating the stops are sensors which sense the travel of the stacks before they reach the stops.

Sensors S-1 through S-4 in the modules 20 and 22 as seen in FIGS. 1 and 2 overlie four equally spaced tortilla stacks traveling lanes which extend longitudinally of the module. The sensors are elevated above the stacks which are passing longitudinally from the baking end to the discharge end. The stacks are carried longitudinally away from the stacking machine having been deposited into one of the four described lanes at random longitudinally in the conveyor belt 25 by the stacker. As the stacks exit the stacking machine, the stacks are deposited on a conveyor, commercially known as a Shuttleworth, comprising individual rollers all driven by power. Where the stacks of tortillas come to a halt because of a gate, which will be described, a slip clutch disengages, the rollers stop and do not continue to drive against the gate barrier.

Each of the sensors S-1, S-2, S-3, S-4 are associated with a pair of gates, such as G-1, a front gate, and GR-1 a rear gate.

The sensors can be of any suitable type including a proximity sensor having a feeler wire which extends in the path of the stacks, or a photoelectric beam which is interrupted by the stacks.

Also associated with the sensors S-1 through S-4 is a belt conveyor C-B having five equally spaced belts that are interleaved between equally spaced longitudinally directed powered rollers, C-R. These belts C-B can be selectively raised and lowered between the rollers. As further shown in FIG. 2, a packaging belt conveyor C-P is positioned adjacent the discharge side of the T-module.

The power-driven spaced rollers C-R extend longitudinal of the travel of the packaging line conveyor C-P as are shown in the drawing FIG. 2. There are nine such rollers.

Another feature of the T-module being described is a wall, barrier "B" extending perpendicular to the stack travel from the stacker.

When the stacks come down the lanes as will be described, the power driven rollers C-R drive the stacks away from the baking end up against the barrier B wherein the stacks are free to slide along the barrier toward the packaging machine when the belts C-B are raised.

The linear conveyor C-L is disposed perpendicularly to the path of travel of the baking machine direction and the module direction. C-L is comprised of five belts traveling in the longitudinal direction shown. The linear conveyor also comprises two elevator elements E-1 and E-2. Both elevators comprise four longitudinally extending rails interleaved between the five driven belts of the linear conveyor C-L. Each elevator is capable of being lifted above the upper surface of the belts of the linear conveyor C-L or drawn beneath the upper surface of the linear conveyor C-1.

Also spaced along the path of the linear conveyor are two sensors, S-5 and S-6. These sensors can suitably be of an optical type which have an emitter and a receiver which are located across the path of the travel of conveyor C-1.

The sensor S-5 senses stacks of tortillas approaching the T-module from the L-module that have been deposited by the L-module on the conveyor C-L. Sensor S-6 detects additional stacks approaching a series of stacks already stopped, which were in elevator E-2 on the raised rails so that the belts of C-L continue their movement but the tortilla stacks are raised above such movement.

The Operation
FIGS. 2 through 3-C

As seen in these figures, the T-module is going through a transfer cycle wherein a row of tortillas evenly spaced are being deposited on the belt conveyor C-B. While this transfer cycle is taking place, the file of tortilla stacks coming from the L-module are temporarily delayed by the action of the elevation of elevator E-2. In the event there is an additional file progressing toward E-2, the elevator E-1 raises, thus delaying a second file of four.

In this description, a file will mean stacks of tortillas moving forward in unison and uniformly spaced one behind another, whereas a row will refer to stacks of tortillas moving forward one uniformly spaced beside another.

Where reference is made to a file of four, there will be merely a file of three, or two, or even one where the stacker does not deposit enough stacks in given lanes within a time period which will be described in a timing cycle.

The belts in conveyor C-L move continuously and at a fixed elevation. The interruption and delay in any stacks progressing along the belt C-L is only effected by the elevation of elevators E-1 and E-2 as described. These elevators are simply support columns or rods which extend vertically and are hydraulically elevated to raise the bed of rails as designated above.

The belt conveyor C-B as seen is a similar type of driven conveyor and again comprises five belts in line with the five belts of C-1. However, the belts of C-B are themselves raised or lowered during the transfer cycle of a row of stacks from T-module or the L-module. The function of conveyor C-B is the same either for the L-module or the T-module.

As shown the C-P conveyor is simply a standard type of moving flat belt, which takes the stacks of tortillas from the C-B conveyor into the packaging machine. The C-P conveyor receives the stacks in files having the stacks evenly spaced one behind another.

FIGS. 3A and 4A

With respect to FIG. 3A and 4A, on FIG. 3A there is shown a condition wherein two stacks of tortillas have passed under two sensors S-1 and S-2 initiating a cycle wherein all four front gates, G-1 through G-4, are up. With respect occur from the time of activation of the sensor S-1 through S-4 effecting the motions of the front gate, the rear gate, and the transfer belt conveyor, that is C-B. When any one of the sensors is activated S-1 through S-4 which means that a lead stack may be in any one of the lanes, the stack is carried forward by the Shuttleworth conveyor and comes to rest against the front gate G-1. This is an example. The first stack that arrives, there is a time delay as shown in FIG. 4A wherein all four front gates will stay up for a maximum waiting time of 14 seconds. After the stack has activated any of the sensors, for instance, S-1, 1.5 seconds after arrival at the front gate, a rear gate G-1 will come up. A waiting time having a maximum length of 14 seconds will occur from the time of the first arrival as sensed above. The 14 seconds is in the program. A second stack may come along as shown for instance in FIG. 4A designated S-2 activated. The designated VAR stands for a variable time and in fact an arbitrary time since the stacker has no timing precision with respect to depositing stacks in a given lane. When the second stack arrives, for instance, S-2 as seen in the illustrated chart of FIG. 4A, again there is a 1.5 second delay until the rear gate GR-2 rises.

As seen in FIG. 4A the front gate is up, that is all four front gates are up as seen in Graph 4A. The rear gates G-1 and G-2 are up, but the other lanes that have not been sensed G-3 and 4, the rear gates are not up.

If for instance, an example, two stacks arrive and there are no other stacks in the other lanes, at the end of 14 seconds the front gates will go down as seen in FIG. 4A. This is designated as the maximum waiting time. The rear gates will go up. The remaining gates G-3 and G-4 will go up. The transfer belt conveyor C-B will go down. When the front gates go down, any and all stacks, with a minimum of one, will go forward in a row onto the C-B. In the illustration shown in FIG. 3A, there were only two stacks present and the two stacks will travel from the Shuttleworth conveyor onto the longitudinal rollers C-R which are powered, and which will drive the stacks over the top of the downwardly retracted belt conveyors C-B until they hit the longitudinal barrier B. They will come to rest there even though they continue to be driven by the rollers.

The transfer time from the moment the front gates go down until the stacks come to rest against the barrier B has a timing span of 2.7 seconds. That is the amount of time allowed to transfer from the front gate up against the barrier B where the transferred stacks are now sitting above the downwardly retracted belt conveyor C-B. At the end of 2.7 seconds, the belt conveyor is raised, the front gates G-1 through G-4 go up and the rear gates go down and a new cycle is initiated. When the belt conveyor is raised it carries away the two stacks that have been up against the barrier B to the packaging conveyor C-P.

The cycle is initiated by the passing of at least one stack. The maximum waiting time allowed in the program for the cycle to begin has been described above and the cycle starts whether a stack or stacks are present for involvement in the cycle.

What has been described above is a first possible condition. A second possible condition is shown in FIGS. 3B and 4B.

In the scene shown in FIGS. 3B and 4B, the maximum waiting time is shortened in the computer program, based on conditions which will be described. In FIG. 3B, three sensors S-1, S-2, S-4, have been activated in lanes L-1 and L-2. As they are activated in accordance with the program, there is a 1.5 second delay until the corresponding rear gate is raised. The basis of course is that it takes this long for one stack to move from behind the rear gate to forward of the rear gate. The program is set so that when three stacks are at the front gate, the transfer cycle will be initiated after waiting 3.5 seconds after the arrival of the last stack. This is shown in FIG. 4B. As seen therein, S-1 has been activated which was the beginning of the cycle and is designated at 0 time in seconds. S-2 has been activated at some variable time after S-1, and S-4 has been activated at still a different time. It is again emphasized that although in this example, the activator is in numerical progression, any random arrivals may occur. For instance, S-3 may be activated before S-1 and S-4 before S-2. The arrival of the stacks and the triggering of the sensors is entirely random.

In the example being discussed, from the time the S-4 was activated, there is a 3.5 second waiting time until the front gates go down. A fourth stack may or may not arrive but this is not determinative as to the time the front gates will go down. At the end of 3.5 seconds, the front gates will go down, all rear gates will be up and the transfer belt will go down for a period of 2.7 seconds and there will be a revised reset. The original reset will have been cancelled during this cycle.

It should be understood of course that the cycle shown in 4B only occurs when at least a third stack is sensed prior to the 14 second time span as set forth in 4A.

In this example, when the third stack hits the front gate before the original waiting time, the waiting time is shortened to 3.5 seconds before commencing the transfer cycle. With three sensors activated, there is no need to wait longer.

FIGS. 3C and 4C

In FIGS. 3C and 4C there is shown a condition where all four lanes have stacks therein, all four front gates are up, all four rear gates are up and the transfer cycle begins immediately as soon as all four sensors are activated. The front gates go down, all the rear gates go up and the transfer belt conveyor goes down for 2.7 seconds. At that time a new cycle is initiated wherein the front gates go up, the rear gates go down and the original 14 second maximum waiting time is programmed and reinitiated into the system.

The operation continues and one of the cycles shown in FIGS. 4A, 4B or 4C is then initiated depending on the conditions set forth above as to the arrival times of the various stacks.

FIGS. 5, 6A and 6B

With reference to FIG. 5, 6A and 6B there is shown an automated traffic control system of the stack outputs of the L-modules and T-modules.

These stack outputs are controlled so that a uniform file is formed from both modules and deposited on the packaging machine conveyor line C-D.

In operation, there is a flow of stacks from the T-module onto the conveyor C-B and a flow of stacks from the L-module onto the linear conveyor C-L. In order to keep the stacks continuously spaced and flowing into the packaging machine on conveyor C-P, there is a need to coordinate the deposits into the packaging machine. As seen in FIG. 5, the sensors S-1, S-2, S-3, and S-4, any one or all of them can initiate the transfer cycle in the T-module. These sensors are also connected to a system for traffic control of the outputs of the L and T-modules. A sensor box 10 is connected to a logic system 12. On the linear conveyor, there are designated sensors S-5 and S-6. The sensor S-5 block 14 detects stacks approaching the T-module. The sensor S-6 block 16 is for the detection of stacks approaching elevator E-1. The sensors S-5 block 14 and S-6 block 16 are also tied to the logic system block 12 for traffic control.

In operation, sensors S-1 through S-4 initiate the transfer cycle and at the same time the sensors S-5 detect traffic approaching on the linear conveyor. The decision as to whether to hold the transfer cycle on the T-module and to permit the movement on the linear conveyor or traffic on the belt conveyor while the transfer cycle is being completed on the T-module, is made through the logic system for traffic control block 12. In the first instance, with respect to FIG. 6A, the T-module is completing a transfer cycle while the linear conveyor elevator E-1 has been raised and holds or delays a file of stacks immobile and a second set of file of stacks is held approaching the first elevator E-1 is also delayed while the cycling on the T-module is completed. In FIG. 6B the transfer cycle of the T-module is delayed while the stacks on the linear conveyor are transported across the belt conveyor to the packaging conveyor.

The decision as to implement the arrangement of FIG. 6A or the arrangement of FIG. 6B, that is, as to which of the files and which of the stacks will be held up, is determined by the logic system for traffic control wherein the position of the advance of the particular stacks are located is determined. For instance, if the file of stacks as seen in FIG. 6B has already begun and entry is already being made as shown in the drawings of the stacks on the linear conveyor, the transfer cycle of the T-module is delayed until the stacks have cleared the conveyor. On the other hand if the cycle as shown in FIG. 6A of the T-module is such that transfer has begun, then the elevators E-1 and E-2 are programmed to interrupt the flow and delay the entry from the conveyor to the path of the emerging stacks from the T-module.

The above discloses an automated feeding system wherein order is being made out of random spacing of the stacks. In effect, random forward moving stacks are brought into alignment into rows and then the rows are deposited wherein they progress single file fashion on a belt conveyor and then merge into other files. There is first an arrangement into a uniform pattern from a random pattern wherein the uniform pattern is then intermeshed with other uniform patterns to prepare for an end result which is a spaced uniform feeding into a packaging machine. Furthermore, there is an element of decision making which is based among other things on a timed interval or the passage of time. That is, there is a decision making wherein one, two, three or four stacks may be passed into the system without waiting for an extremely long time for four stacks, as an example, which would delay the entire system. There is present a factor of prudent decision-making as to whether to move on without a full load at a certain time.

What is claimed is:

1. A system for automatically controlling spacing and forward travel of stacks of tortillas emerging at random, in a first direction, from each of a plurality of tortilla stackers extending side by side and parallel to one another, and then combining, in a second direction perpendicular to the first direction, the tortillas emerging from the stackers into a single file of spaced stacks that are fed into a packaging machine; comprising a) sensor means on each stacker for sensing travel in the first direction of the stacks from said each stacker;

b) means activated by the sensor means on each stacker for selectively stopping travel of the stacks to successively form a row of stacks from each stacker, wherein each row is formed of stacks one beside another uniformly spaced;

c) means for selectively advancing the rows formed on each of the stackers to convert the rows of stacks emerging from the plurality of stackers into one advancing single file of stacks wherein the stacks are uniformly spaced one behind another, for travel in the second direction and feeding into a packaging machine; and d) an automated system for centrally controlling each of the above means and coordinating all stack movements from the stackers into the packaging machine.

2. The system of claim 1 wherein the sensor means includes forward and rearward sensors.

3. The system of claim 1 wherein the means for selectively stopping the travel of the stacks includes gates.

4. A system of claim 1 wherein the means for selectively advancing the rows formed on each of the stackers includes means for delaying the output of at least one of the stackers into the packaging machine while feeding the output of the other stackers into the packaging machines.

* * * * *